United States Patent
Li (10) Patent No.: US 10,038,737 B2
(45) Date of Patent: Jul. 31, 2018

(54) APPLICATION RECOMMENDATION METHOD, DEVICE, AND SYSTEM

(71) Applicant: Huawei Technologies Co., Ltd.

(72) Inventor: Zijun Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 434 days.

(21) Appl. No.: 14/528,947

(22) Filed: Oct. 30, 2014

(65) Prior Publication Data

US 2015/0052195 A1 Feb. 19, 2015

Related U.S. Application Data

(63) Continuation of application No. PCT/CN2013/074800, filed on Apr. 26, 2013.

(30) Foreign Application Priority Data

May 3, 2012 (CN) .......................... 2012 1 0134623

(51) Int. Cl.
G06F 15/16 (2006.01)
H04L 29/08 (2006.01)
H04W 4/80 (2018.01)

(52) U.S. Cl.
CPC ............. H04L 67/06 (2013.01); H04L 67/18 (2013.01); H04L 67/34 (2013.01); H04W 4/80 (2018.02)

(58) Field of Classification Search
CPC ......... H04L 67/06; H04L 67/18; H04L 67/34; H04W 4/80

(Continued)

(56) References Cited

U.S. PATENT DOCUMENTS

2003/0208595 A1* 11/2003 Gouge .................... H04L 67/16
709/225
2007/0113246 A1* 5/2007 Xiong ................ H04N 7/17318
725/39

(Continued)

FOREIGN PATENT DOCUMENTS

| CN | 101895872 A | 11/2010 |
| CN | 101959179 A | 1/2011 |
| CN | 102694846 A | 9/2012 |

OTHER PUBLICATIONS

Chandrashekhar, Uma, Steven H. Richman, S. Rao Vasireddy, and Chen Xie. "Applications exchange: A unified approach to enable services and applications for end users and service providers." Bell Labs technical journal 7, No. 1 (2002): 47-62.*

Primary Examiner — Cheikh Ndiaye
Assistant Examiner — Melaku Habtemariam
(74) Attorney, Agent, or Firm — Slater Matsil, LLP (57) ABSTRACT

Embodiments of the present invention disclose an application recommendation method, device, and system, which relate to the field of network technologies, and can recommend an application related to a service system to a user in real time according to location information of a terminal device and the service system, to save the user's time for querying the application. The method includes initiating a broadcast message to each service system located within a preset geographic location range, so that each service system returns a response message; and when an application corresponding to a response message of the service system is not installed in a terminal device, sending a download request to a server; and downloading and installing the application according to download information sent by the server.

17 Claims, 4 Drawing Sheets (58) Field of Classification Search
USPC .............................. 709/201–204, 217, 232
See application file for complete search history.

(56) References Cited

U.S. PATENT DOCUMENTS

| | | | |
|---|---|---|---|
| 2008/0052745 A1* | 2/2008 | Li | H04H 60/72 725/58 |
| 2009/0063624 A1* | 3/2009 | Nordstrom | H04M 1/72525 709/203 |
| 2009/0318171 A1* | 12/2009 | Backholm | H04L 67/16 455/466 |
| 2010/0060802 A1* | 3/2010 | Huegel | H04N 21/4722 348/734 |
| 2011/0088051 A1* | 4/2011 | Zhu | H04H 60/72 725/14 |
| 2012/0089974 A1* | 4/2012 | Cho | G06F 8/61 717/173 |

* cited by examiner

APPLICATION RECOMMENDATION METHOD, DEVICE, AND SYSTEM

This application is a continuation of International Application No. PCT/CN2013/074800, filed on Apr. 26, 2013, which claims priority to Chinese Patent Application No. 201210134623.9, filed on May 3, 2012, both of which are hereby incorporated by reference in their entireties.

TECHNICAL FIELD

The present invention relates to the field of network technologies, and in particular, to an application recommendation method, device, and system.

BACKGROUND

With wide use of smart terminal devices such as smart phones, application stores for these smart terminal devices appear on servers. A user can select an application that meets the user's requirement from an application store for installation and use. For example, a smart phone user may connect a mobile phone via a USB (universal serial bus) or Wi-Fi (Wireless Fidelity) to a PC (personal computer) that is connected to the Internet, and download a required application from the application store to the mobile phone through software (for example, Wandoujia, or 91 Assistant) on the PC. The mobile phone may further be directly connected to the application store through the Internet and download the application to the mobile phone.

During the foregoing process, when searching the application store for a required application, the user first needs to log in to an application store client, and then may perform a rough screening in a classification manner (such as using an alphabetical sequence of applications or file sizes of applications) provided by the application store. Furthermore, to perform a more delicate screening, the user is required to view, one by one, a large number of applications of a same type that were roughly screened out using the classification manner of the application store. If a screening result cannot meet the user's requirement, it is necessary for the user to search again and re-select an application classification manner. Finally, after such a process is repeated several times, the application required by the user is found from the numerous applications. With increase of the number of applications, the user's searching becomes more cumbersome and more prone to error. Therefore, the user needs to spend a great deal of time in finding the required application.

SUMMARY

Embodiments of the present invention provide an application recommendation method, device, and system, to save a user's time for querying an application from an application store.

In one aspect, an application recommendation method is provided including initiating a broadcast message to each service system located within a preset geographic location range, so that each service system returns a response message. When an application corresponding to a response message returned by a service system is not installed in a terminal device, sending a download request to a server, so that the server returns download information, and downloading and installing the application according to the download information returned by the server.

In another aspect, an application recommendation method is provided including receiving a broadcast message sent by a terminal device located within a preset geographic location range of a service system, and returning a response message to the terminal device, so that the terminal device determines whether an application corresponding to the response message has already been installed.

In another aspect, a terminal device is provided including a sending module configured to initiate a broadcast message to each service system located within a preset geographic location range, so that each service system returns a response message. The terminal device further includes a determining and sending module configured to determine whether an application corresponding to the response message returned by a service system has already been installed in the terminal device. When an application corresponding to a response message returned by a service system is not installed in the terminal device, send a download request to a server, and a downloading and installing module, configured to download and install the application according to download information sent by the server.

In another aspect, a service system front end device is provided including a receiving module configured to receive a broadcast message sent by a terminal device located within a preset geographic location range of a service system. The service system front end device further includes a sending module configured to return a response message to the terminal device, so that the terminal device determines whether an application corresponding to the response message has already been installed.

In another aspect, an application recommendation system is provided including the terminal device, the service system, and the server.

In the application recommendation method, device, and system provided in the embodiments of the present invention, the terminal device initiates a broadcast message to each service system located within the preset geographic location range of the terminal device, and automatically searches for and downloads an application corresponding to a response message according to the response message returned by a service system. In this way, the terminal device, located in any geographic location, can interact with a service system near the terminal device, and automatically search for and download an application according to a response message of the nearby service system, thereby achieving technical effects of recommending an application related to the service system to a user according to location information of the terminal device and the service system in real time, and saving the user's time for querying the application.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the embodiments of the present invention, a user refers to a holder of a terminal device. The user can interact with and control a service system using an application, where the service system is generally a system integrated with software and hardware, and the service system has attributes of a service system identifier, a service type, and a service name. The terminal device refers to a portable device, such as a smart phone or a tablet computer, in which an application can be installed. An application store refers to an application download service deployed on the Internet, which may be an independent third-party download website, and may also be a program download website set up by a provider who provides the service to the service system. An application in the application store has attributes of an application identifier, an application version, and a service system identifier corresponding to the application. A service system front end device refers to an electronic device (for example, a set top box of a smart television) that can be controlled using an application installed in the terminal device, or a serving device (for example, a point of sale terminal (POS) machine provided by a provider), which is provided by a provider and related to a geographic location. The service system front end device is located within a preset geographic location range of the terminal device. A relationship between the service system and the applications that are installed in the service system front end device is a one-to-many relationship, that is, one service system can interact with multiple applications of different versions that support the service. For example: with respect to a same smart set top box in a house, the host, the hostess, and a child may interact with the set top box of a same version using remote control applications of three different versions, respectively.

For an interface between the terminal device and the service system, a near field communication protocol, for example, Bluetooth, infrared, near field communication, Wi-Fi (Wireless Fidelity), or the like, is used in a communication layer. An interface between a mobile terminal and an application store in a server is implemented using a formatted text such as XML (Extensible Markup Language) SOAP (Simple Object Access Protocol), or the like on a HTTP (Hyper Text Transfer Protocol) or a HTTPS (Hypertext Transfer Protocol over Secure Socket Layer). An interface between the service system and the application store in the server is implemented using a formatted text such as XML, SOAP, MIME (Multipurpose Internet Mail Extensions), or the like on HTTP or HTTPS. Communication between the service system and the application store is not mandatory. If the communication is available, the service system is capable of upgrading itself, and the like. If no communication is available, the capability of the service system is fixed after delivery. An interface between the service system and a service system back end device is implemented using a formatted text such as XML, SOAP, MIME, or the like on HTTP or HTTPS.

Figure 1:
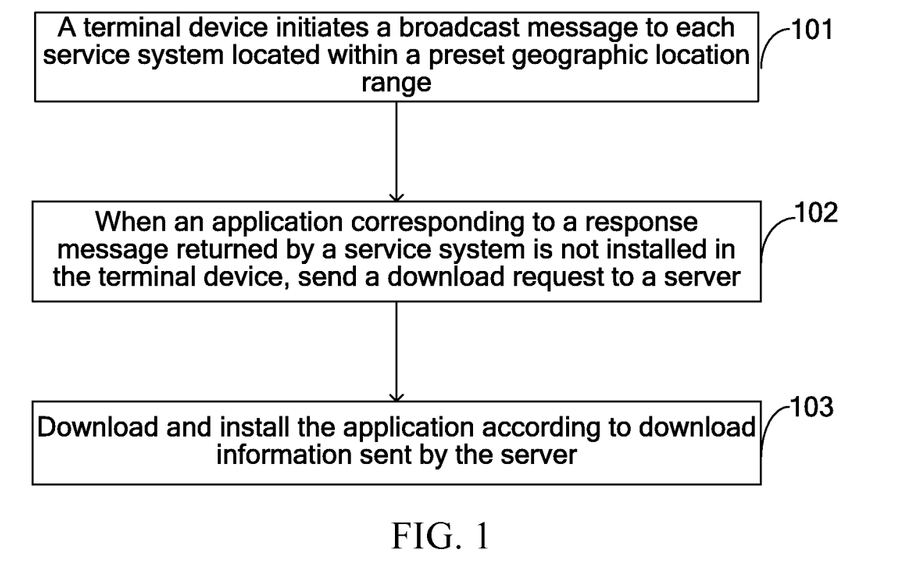
FIG. 1 is a flow chart of an application recommendation method according to an embodiment of the present invention.

As shown in FIG. 1, an embodiment of the present invention provides an application recommendation method. Step 101 of this method includes a terminal device initiating a broadcast message to each service system located within a preset geographic location range.

One terminal device may support multiple users, and the broadcast message carries a terminal device identifier and a user identifier that are used by the service system to identify a terminal device and a user that send the broadcast message, respectively. In an embodiment, the terminal device identifier may be a serial number of the terminal device in the service system. The user identifier may be a registered name of a user who currently uses the terminal device.

The preset geographic location range refers to a range in which a connection can be established between the terminal device and the service system using an NFC (Near Field Communication) protocol. That is, a range in which the terminal device can normally communicate with the service system.

In an embodiment, this step may be initiating, by the terminal device, the broadcast message to the service system located within the preset geographic location range every preset first time interval.

In another embodiment, this step may also be initiating the broadcast message to the service system located within the preset geographic location range upon receiving of a detection instruction of a user.

Step 102 includes when an application corresponding to a response message returned by a service system is not installed in the terminal device, sending a download request to a server.

The download request includes a service type and a service identifier corresponding to the application that is not installed, and is used for searching, by the server, for the application according to the service type and the service identifier. In an embodiment, the service type may be a service type, such as television remote control and air conditioner remote control, which can be controlled by a service system front end device, and the service identifier may be a serial number of the service in the service system. The application corresponding to the response message of the service system refers to an application having a service type and a service identifier that are the same as those carried in the response message returned by the service system.

Step 103 includes downloading and installing the application according to download information sent by the server.

The download information includes an application identifier, an application name, and an application icon, and is used for determining an application required to be downloaded. The application identifier may be a serial number of the application in the application store.

In the application recommendation method provided in the embodiment of the present invention, the terminal device initiates a broadcast message to each service system located within the preset geographic location range of the terminal device, and automatically searches for and downloads an application corresponding to a response message according to the response message returned by a service system. In this way, the terminal device, located in any geographic location, can interact with a service system near the terminal device, and automatically search for and download an application according to a response message of the nearby service system, thereby achieving technical effects of recommending an application related to the service system to a user according to location information of the terminal device and the service system in real time, and saving the user's time for querying the application.

Figure 2:
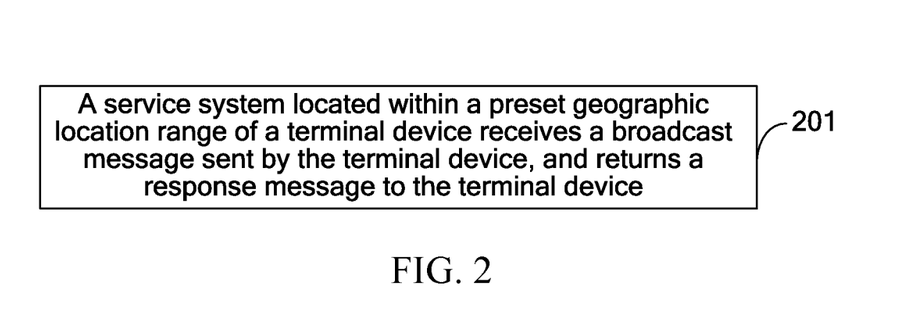
FIG. 2 is a flow chart of an application recommendation method according to another embodiment of the present invention.

As shown in FIG. 2, another embodiment of the present invention provides an application recommendation method. Step 201 of this method includes a service system located within a preset geographic location range of a terminal device receiving a broadcast message sent by the terminal device, and returning a response message to the terminal device.

This step is executed by each service system located within the preset geographic location range of the terminal device. The broadcast message sent by the terminal device carries a terminal device identifier and a user identifier that are used by the service system to identify the terminal device and the user that sent the broadcast message. In an embodiment, the terminal device identifier may be a serial number of the terminal device in the service system. The user identifier may be a registered name of a user who currently uses the device. The response message carries a service type and a service identifier of the service system and a URL (Uniform Resource Locator, uniform resource locator) address of an application store. The service type and the service identifier are used for determining, by the terminal device, whether an application corresponding to the service type and the service identifier has already been installed, and the URL of the application store is used for identifying a download address of the application corresponding to the service type and the service identifier. In an embodiment, the service type of the service system may be a serving type, such as television remote control and air conditioner remote control, which can be controlled by a service system front end device, and the service identifier may be a serial number of the service in the service system. Furthermore, the response message may further include a service version. In this way, the terminal device can download in time an application of a new version provided by the service system.

It should be noted that, the service system may be classified into a service system to which a service system back end device is connected and a service system to which no service system back end device is connected. In this step, the service system to which the service system back end device is connected may send a request to the service system back end device connected thereto. The service system back end device refers to a back end support part of the service system, and this part may be, for example, a video website that cooperates with a set top box of a television, a settlement system connected to a POS machine, or the like, is deployed on the Internet.

In the application recommendation method provided in the embodiment of the present invention, after receiving a broadcast message initiated by the terminal device, all service systems located within the preset geographic location range of the terminal device return response messages to the terminal device. In this way, the terminal device can automatically search for and download applications corresponding to the response messages according to the response messages returned by the service systems, thereby achieving the technical effects of recommending an application related to the service system to a user according to location information of the terminal device and the service system in real time, and saving the user's time for querying the application.

Figure 3:
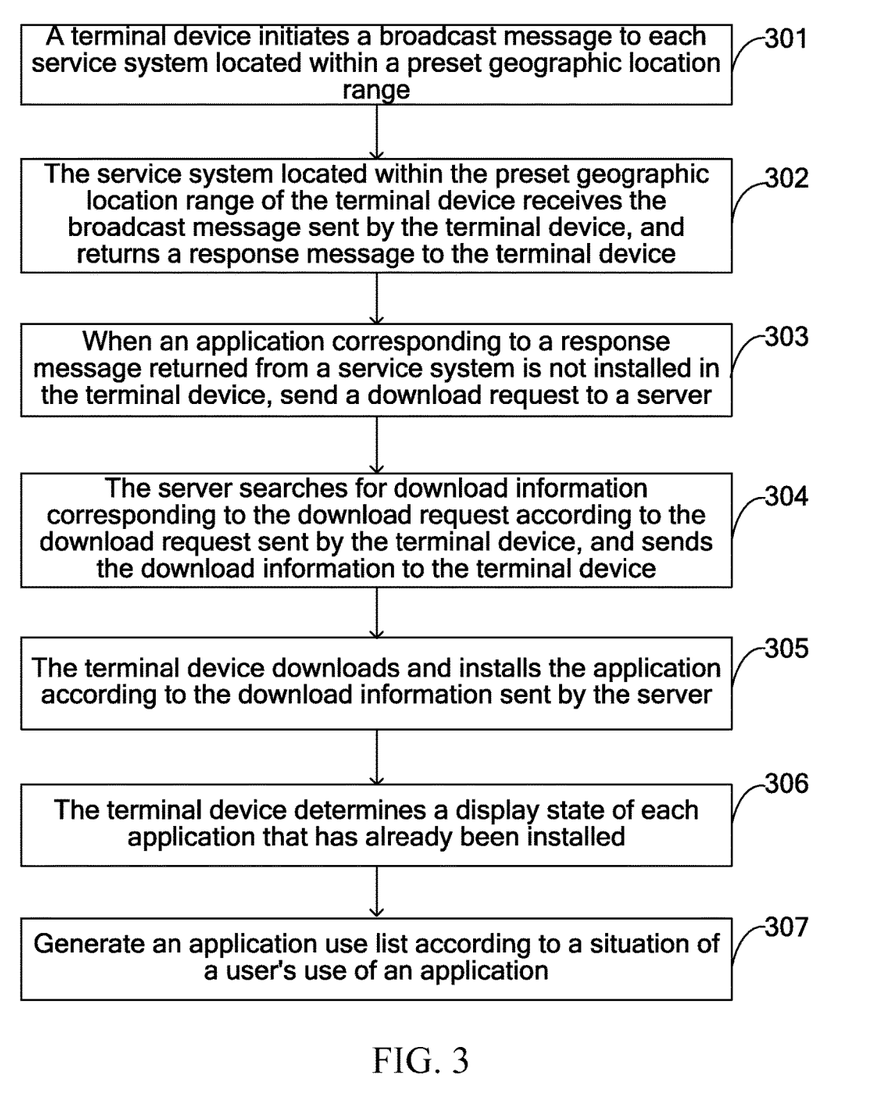
FIG. 3 is a flow chart of an application recommendation method according to still another embodiment of the present invention.

The following describes in detail an application recommendation method provided in still another embodiment of the present invention by taking a process in which a user selects an application using a smart phone to control a smart television as an example, where a terminal device is the smart phone (referred to as the mobile phone hereinafter), and a set top box of the smart television is a service system front end device. A service system is set in the set top box of the smart television, and the set top box is connected to the Internet via a broadband. This embodiment of the application recommendation method is shown in FIG. 3.

Step 301 includes a terminal device initiating a broadcast message to each service system located within a preset geographic location range.

The preset geographic location range refers to a range in which the terminal device can be connected to the service system using an NFC protocol. In this embodiment, it is set that the connection is implemented using a Wi-Fi protocol, and the mobile phone and the service system are within a range of one network segment, that is, a range in which the mobile phone can normally communicate with the set top box of the smart television.

When being carried by a user to a new geographic location, the mobile phone first establishes a near field communication layer connection with each service system located in the same network segment as the mobile phone. A specific connection manner is related to a communication protocol between the mobile phone and the service system. For example, for a communication protocol in a Wi-Fi manner, implementation of the connection requires a Wi-Fi connection function provided by an operating system of the mobile phone. Furthermore, by setting a Wi-Fi router, a connection password is further required to be entered when the connection is being established. For a communication protocol in a Bluetooth manner, it is necessary to detect, using a Bluetooth function provided by the operating system of the mobile phone, whether a Bluetooth service exists, so that pairing can be performed to implement the connection. In this manner, pairing is not required during subsequent connection establishment as long as the paired Bluetooth service is detected, and the connection may be implemented directly using the Bluetooth function. A communication protocol in the NFC manner uses a point to point communication mode, in which data is exchanged between a mobile terminal and the service system.

After the mobile phone establishes the communication layer connection with each service system, this step may be implemented in the following two embodiments.

In a first embodiment, the mobile phone initiates a broadcast message to each service system located within the preset geographic location range every preset first time interval. For example, the first time interval may be set to 12 hours. In this way, the mobile phone initiates the broadcast message to each service system located in the same network segment as the mobile phone every 12 hours.

In a second embodiment, the mobile phone initiates a broadcast message to each service system located within the preset geographic location range upon receiving of a user's detection instruction. For example, the user may send a detection instruction to the mobile phone by pressing a "detect" button set on the mobile phone. The "detect" button may be a physical button, and may also be an icon displayed on the touch display screen of the mobile phone. In this way, the mobile phone initiates the broadcast message to each service system in the same network segment as the mobile phone only when receiving the detection instruction of the user.

The broadcast message in any one of the foregoing embodiments carries a terminal device identifier and a user identifier. For example, the terminal device identifier may be a mobile phone number, a serial number of the mobile phone in the service system, or the like. The user identifier may be a registered name of the user in the current service. In this step, the mobile phone user needs to register in the application store if the user has not yet registered therein.

Step 302 includes the service system located within the preset geographic location range of the terminal device receiving the broadcast message sent by the terminal device, and returning a response message to the terminal device.

The broadcast message sent by the mobile phone carries a terminal device identifier and a user identifier. The response message returned by each service system carries a service type and a service identifier of the service system and a URL address of the application store. Furthermore, the response message may further include a service version of the service system.

It should be noted that, in this step, a service system to which a video website cooperating with a set top box of a television is connected may send a request to the video website connected thereto, to acquire a latest program list.

Step 303 includes when an application corresponding to a response message from a service system is not installed in the terminal device, sending a download request to a server.

In an embodiment, after receiving the response message returned by the service system, the mobile phone first determines whether the application corresponding to the service type and the service identifier of the service system carried in the response message has already been installed. When it is determined that an application corresponding to a service type and a service identifier of a service system returned by a service system is not installed, the mobile phone may generate a search keyword according to the service type and the service identifier in the response message, and send a download request carrying the search keyword to the server using the URL address of the application store that is carried in the response message. Furthermore, when the response message further includes a service version, if the application corresponding to the service type and the service identifier has already been installed in the mobile phone, but a service version of the application differs from the service version in the response message, the mobile phone may still send the download request to the server.

The application corresponding to the response message of the service system refers to an application having a service type and a service identifier that are the same as those carried in the response message returned by the service system.

Step 304 includes the server searching for download information corresponding to the download request according to the download request sent by the terminal device, and sending the download information to the terminal device.

The download request includes a service type and a service identifier of a service system corresponding to an application required to be downloaded. In an embodiment, the service type of the service system is a television remote control service, and the service identifier is a serial number of the television remote control service in the service system. Multiple applications that conform to the service type and the service identifier that are included in the download request may exist in the server, and the server sends download information corresponding to all the obtained applications to the terminal device. The download information includes an application identifier, an application name, and an application icon. The application identifier may be a serial number of the application in the application store.

Step 305 includes the terminal device downloading and installing the application according to the download information sent by the server.

The download information includes an application identifier, an application name, and an application icon. For example, when the application required to be downloaded is a Web App, the mobile phone only needs to display the application icon in the download information on the interface. When the application required to be downloaded is a Native App, after confirmation is performed automatically by the mobile phone or manually by the user, the mobile phone sends a final download request carrying the application identifier to the server. The server searches for an application having an application identifier the same as that in the final download request, and returns a confirmation response to the mobile phone. When the server finds an application having an application identifier the same as that in the final download request, the confirmation response returned to the mobile phone carries the found application. Next, an operating system in the mobile phone installs/upgrades the application returned by the server. After the installing/upgrading, an icon of the application may be automatically displayed on the interface. When the server fails to find an application having an application identifier the same as that in the final download request, the confirmation response returned to the mobile phone carries abnormal prompt information, for example, "download abnormal".

Step 306 includes the terminal device determining a display state of each application that has already been installed.

In an embodiment, this step includes each application that has already been installed in the mobile phone sends a display message to a service system corresponding to the application every second time interval, for example, 24 hours. When the service system is located within the preset geographic location range of the mobile phone, for example, when it is located in the same network segment as the mobile phone, the service system returns a display message response to the application. After receiving the display message response, the application is displayed in a first display state. The first display state may be that the application icon is displayed in a state of highlighting, flashing, the like, or a color of the application icon is changed to make the application icon striking. Meanwhile, the application icon may also be displayed in a striking position in the front of a display area. When the service system is located beyond the preset geographic location range of the mobile phone, for example, when it is not located in the same network segment as the mobile phone, the service system may not return a display message response to the application. In this case, the application is displayed in a second display state. For example, the application icon may be displayed in a state such as grey and no flashing. Meanwhile, the application icon may also be displayed in a secluded position in the back of the display area.

In another embodiment, this step includes initiating, by the terminal device, the broadcast message to the service system located within the preset geographic location range upon receiving of the user's detection instruction; and determining, by the terminal device according to response messages returned by all service systems, a display state of each application that has already been installed in the terminal device. For example, when the user presses a "detect" button set on the mobile phone, the mobile phone sends a broadcast message to a service system located in the same network segment as the mobile phone, and the service system returns a response message to the mobile phone to indicate that the service system is located in the same network segment as the mobile phone. In this case, an application, which has already been installed in the terminal device and is corresponding to the service system that returns the response message, is displayed in the first display state. An application, which has already been installed in the terminal device and is corresponding to a service system that does not return a response message, is displayed in the second display state. It should be noted that, when the user presses the "detect" button set on the mobile phone, the application downloaded and installed in step 305 is displayed in the first display state by default.

By using this step, the terminal device, located in different geographic locations, may display an application corresponding to a nearby service system in the first display state in the manner of sending a display message to the service system automatically or upon receiving a user's detection instruction, to make it convenient for the user to select a required application.

Step 307 includes generating an application use list according to a situation of the user's use of an application.

In this step, the mobile phone records a time of the user's use of the application, to generate the application use list. The list may be used for analyzing a use habit of the user for the application.

Figure 4:
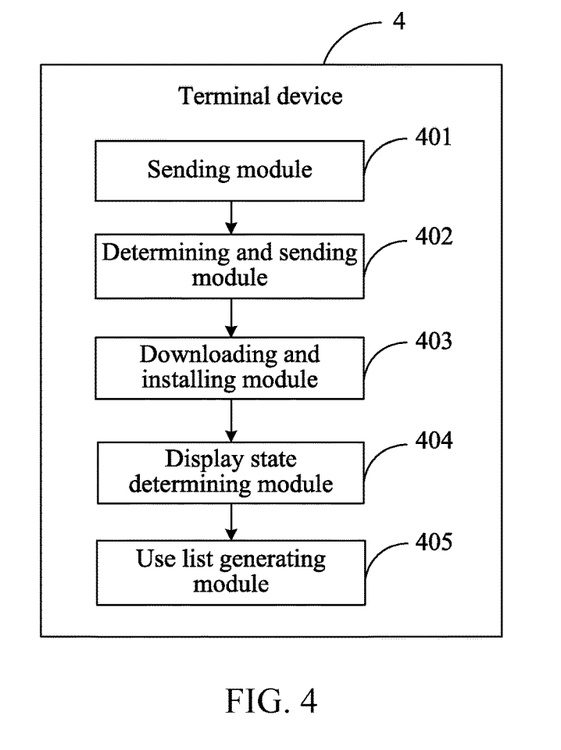
FIG. 4 is a schematic structural diagram of a terminal device according to an embodiment of the present invention.

As shown in FIG. 4, an embodiment of the present invention further provides a terminal device 4. The terminal device 4 includes a sending module 401 configured to initiate a broadcast message to each service system located within a preset geographic location range, so that each service system returns a response message, where the broadcast message carries a terminal device identifier and a user identifier that are used by the service system to identify a terminal device that sends the broadcast message and a user who sends the broadcast message. The response message carries a service type and a service identifier of the service system and a uniform resource locator URL address of an application store, so that the terminal device determines whether an application corresponding to the service type and the service identifier has already been installed. When the application corresponding to the service type and the service identifier is not installed in the terminal device, the terminal device sends a download request to a server according to the URL address.

The terminal device 4 further includes a determining and sending module 402 configured to determine whether an application corresponding to the response message returned by the service system has already been installed in the terminal device. When an application corresponding to a response message returned by a service system is not installed in the terminal device, the determining and sending module 402 is further configured to send a download request to the server.

The terminal device 4 further includes a downloading and installing module 403 configured to download and install the application according to download information sent by the server, where the download information includes an application identifier, an application name, and an application icon.

The terminal device 4 further includes a display state determining module 404 configured to determine and display a display state of each application that has already been installed in the terminal device, and a use list generating module 405 configured to generate an application use list according to a situation of the user's use of an application.

In some embodiments, the terminal device 4 may be a smart phone or a tablet computer.

Figure 5:
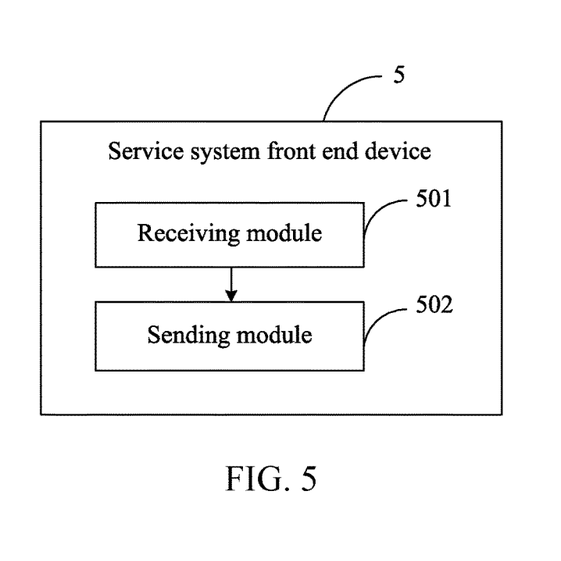
FIG. 5 is a schematic structural diagram of a service system front end device according to an embodiment of the present invention.

As shown in FIG. 5, an embodiment of the present invention further provides a service system front end device 5. The service system front end device 5 includes a receiving module 501 configured to receive a broadcast message sent by a terminal device located within a preset geographic location range of a service system, where the broadcast message carries a terminal device identifier and a user identifier that are used by the service system to identify a terminal device that sends the broadcast message and a user who sends the broadcast message.

The service system front end device 5 further includes a sending module 502 configured to return a response message to the terminal device, so that the terminal device can determine whether an application corresponding to the response message has already been installed, where the response message carries a service type and a service identifier of the service system and a uniform resource locator URL address of an application store, so that the terminal device can determine whether an application corresponding to the service type and the service identifier has already been installed. When the application corresponding to the service type and the service identifier is not installed in the terminal device, the sending module 502 sends a download request to a server according to the URL address.

In an embodiment, the service system front end device 5 may be a set top box of a smart television or a POS machine.

The terminal device or the service system front end device in the embodiments of the present invention can execute the steps in the method embodiments and implement the functions in the method embodiments. In the application processes thereof, the application recommendation method is implemented according to description of the method embodiments.

Figure 6:
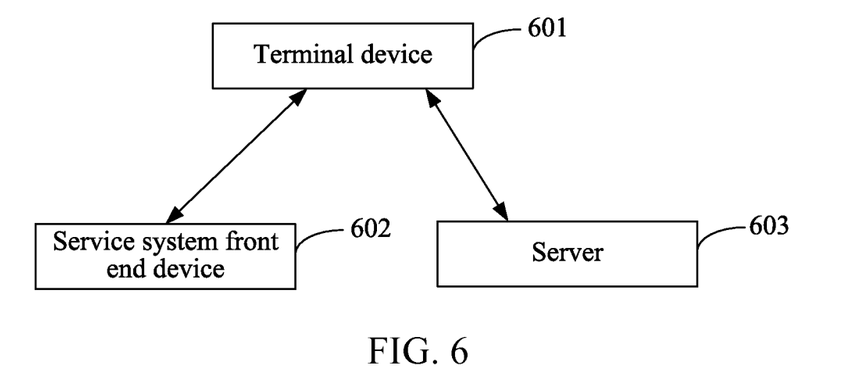
FIG. 6 is a schematic structural diagram of an application recommendation system according to an embodiment of the present invention.

An embodiment of the present invention further provides an application recommendation system. As shown in FIG. 6, the system includes a terminal device 601, a service system front end device 602, and a server 603. The terminal device 601 may be any one of the foregoing terminal devices and the service system front end device 602 may be any one of the foregoing service system front end devices. Working mechanisms of the terminal device 601 and the service system front end device 602 are the same as those of the embodiments shown in FIG. 1 to FIG. 3, which are not described herein again.

A person of ordinary skill in the art may clearly know that the present invention may be implemented through hardware, software, or a combination thereof. When the present invention is implemented using software, the above functions can be stored in a computer readable medium or be transmitted as one or more instructions or codes in the computer readable medium. The computer readable medium includes a computer storage medium and a communication medium, where the communication medium includes any medium that can facilitate transmission of computer programs from one place to another place. The storage medium may be any available medium that can be accessed by a computer. The present invention takes the following as an example, but not limited thereto: the computer readable medium may include a random-access memory (RAM), a read-only memory (ROM), an electrically-erasable programmable ROM (EEPROM), a compact disc ROM (CD- ROM), or other optical disk or magnetic disk storage media or other magnetic storage devices, or any other medium that can be used for carrying or storing desired program codes in an instruction or a data structural form and can be accessed by a computer. In addition, any connection may appropriately serve as a computer readable medium. For example, if the software is transmitted from a website, a server, or other remote sources using a coaxial cable, an optical fiber cable, a twisted pair cable, a digital subscriber line (DSL), or wireless technologies such as infrared ray, radio, and microwave, the coaxial cable, the optical fiber cable, the twisted pair cable, the DSL, or the wireless technologies such as infrared ray, radio, and microwave, shall all fall within the scope of the definition of the medium. For example, disks (Disk) and discs (disc) used in the present invention include a CD, a laser disc, an optical disc, a digital versatile disc (DVD), a soft disk, and a Blu-ray disc, where a disk generally copies data magnetically, while a disc optically copies data using a laser. A combination of the above shall also fall within the protection scope of the computer readable medium.

The above descriptions are merely exemplary embodiments of the present invention, but not intended to limit the protection scope of the present invention. Any modification, variation or replacement that can be easily derived by a person of ordinary skill in the art in the technical scope disclosed by the present invention shall fall within the protection scope of the present invention. Therefore, the protection scope of the present invention shall be subject to the protection scope of the claims.

What is claimed is:

1. An application recommendation method comprising:
receiving, by a terminal device, a message from each electronic device in one or more electronic devices located within a preset area, each of the one or more electronic devices being controllable by the terminal device using an application installed in the terminal device, the message received from each electronic device comprising a service type and a service identifier of a corresponding electronic device, wherein a service type and a service identifier of an electronic device allows the terminal device to identify an application that is used to control operations of the electronic device through the terminal device;
determining, by the terminal device, whether an application used for controlling an electronic device in the one or more electronic devices through the terminal device has been installed in the terminal device based on a message sent by the electronic device in the one or more electronic devices to the terminal device; and
when an application corresponding to an electronic device in the one or more electronic devices is not installed in the terminal device, sending, by the terminal device, a download request to a server that is different from the one or more electronic devices, so that the server returns download information, and
downloading and installing the application according to the download information returned by the server automatically, or downloading and installing the application according to the download information returned by the server upon receiving a confirmation from a user; and
wherein:
a broadcast message is sent by the terminal device, the broadcast message carrying a terminal device identifier and a user identifier that are used by the one or more electronic devices to identify the terminal device that sends the broadcast message and a user who sends the broadcast message, respectively;
a message sent by an electronic device carries a uniform resource locator (URL) address of an application store, so that the terminal device determines whether an application of the electronic device corresponding to a service type and a service identifier has already been installed, and when the application corresponding to the service type and the service identifier is not installed in the terminal device, sends a download request to the server according to the URL address; and
the download request comprises a service type and a service identifier of an electronic device corresponding to an application that is not installed, so that the server searches for the application corresponding to the service type and the service identifier.

2. The method according to claim 1, wherein the message sent by the electronic device further carries a service version of the electronic device.

3. The method according to claim 1, wherein the preset area refers to a range in which a connection can be established between the terminal device and an electronic device using a near field communication (NFC) protocol.

4. The method according to claim 1, further comprising initiating a broadcast message to each electronic device located within the preset area every preset first time interval, wherein the broadcast message comprises information that is used by each electronic device to identify the terminal device.

5. The method according to claim 1, further comprising initiating a broadcast message to each electronic device located within the preset area upon receiving of a user's detection instruction, wherein the broadcast message comprises information that is used by each electronic device to identify the terminal device.

6. The method according to claim 1 further comprising:
sending, by an application that has already been installed in the terminal device, a display message to an electronic device corresponding to the application that has already been installed every preset second time interval; and
determining a display state of the application that has already been installed according to a display response message returned by the electronic device, the display state indicates whether the electronic device is located within the preset area.

7. The method according to claim 6, wherein:
the display state comprises a first display state and a second display state;
the determining the display state of the application that has already been installed according to the display response message returned by the electronic device comprises:
displaying the application, when the electronic device returns a display response message, in the first display state; and
displaying the application, when the electronic device does not return a display response message, in the second display state.

8. The method according to claim 1, further comprising: initiating a broadcast message to each electronic device, and determining, according to messages returned by the one or more electronic devices, a display state of each application that has already been installed in the terminal device.

9. The method according to claim 8, wherein:
the display state of each application comprises a first display state and a second display state;

the determining, according to the messages returned by the one or more electronic devices, the display state of each application that has already been installed in the terminal device comprises:
displaying an application, which has already been installed in the terminal device and is corresponding to an electronic device that returns a message, in the first display state; and
displaying an application, which has already been installed in the terminal device and is corresponding to an electronic device that does not return a message, in the second display state.

10. The method according to claim 1 further comprising:
generating an application use list according to a situation of a user's use of an application.

11. A terminal device comprising:
a memory storage comprising instructions; and
one or more processors in communication with the memory storage, wherein the one or more processors execute the instructions to:
receive a message from each electronic device in one or more electronic devices located within a preset area, each of the one or more electronic devices being controllable using an application installed in the terminal device, the message received from each electronic device comprising a service type and a service identifier of a corresponding electronic device, wherein a service type and a service identifier of an electronic device allows the terminal device to identify an application that is used to control operations of the electronic device through the terminal device;
determine whether an application used for controlling an electronic device through the terminal device has already been installed in the terminal device based on a message sent by the electronic device to the terminal device; and
when an application used for controlling an electronic device through the terminal device is not installed in the terminal device, send, by the terminal device, a download request to a server, and
download and install the application according to download information sent by the server automatically, or download and install the application according to the download information sent by the server upon receiving a confirmation from a user; and
wherein:
a broadcast message is sent by the terminal device, the broadcast message carrying a terminal device identifier and a user identifier that are used by an electronic device to identify the terminal device that sends the broadcast message and a user who sends the broadcast message, respectively;
a message sent by an electronic device to the terminal device carries a service type and a service identifier of the electronic device corresponding to an application and a uniform resource locator (URL) address of an application store, so that the terminal device determines whether the application corresponding to the service type and the service identifier has already been installed, and when the application corresponding to the service type and the service identifier is not installed in the terminal device, sends a download request to the server according to the URL address; and
the download request comprises a service type and a service identifier of a service system corresponding to an application that is not installed, so that the server searches for the application corresponding to the service type and the service identifier.

12. The terminal device according to claim 11, wherein the one or more processors execute the instructions to further:
determine and display a display state of each application that has already been installed in the terminal device, wherein a display state of an application indicates whether a corresponding electronic device is within the preset area.

13. The terminal device according to claim 11, wherein the one or more processors execute the instructions to further:
determine and display a display state of each application that has already been installed in the terminal device, wherein a display state of an application indicates whether a corresponding electronic device is within the preset area.

14. The terminal device according to claim 11, wherein the one or more processors execute the instructions to further:
generate an application use list according to a situation of a user's use of an application.

15. A service system front end device comprising:
a memory storage comprising instructions; and
one or more processors in communication with the memory storage, wherein the one or more processors execute the instructions to:
receive a broadcast message sent by a terminal device located within a preset area of the service system front end device, the broadcast message being sent by the terminal device for detecting one or more service system front end devices within the preset area of the terminal device, wherein each of the one or more service system front end devices can be controlled using an application installed in the terminal device; and
send a response message to the terminal device in response to the broadcast message, the response message comprising a service type and a service identifier of the service system front end device for the terminal device to identify an application that is used for controlling operations of the service system front end device through the terminal device, wherein the response message is used by the terminal device to determine whether the application has already been installed in the terminal device; and
wherein:
the broadcast message carries a terminal device identifier and a user identifier that are used by the service system front end device to identify the terminal device that sends the broadcast message and a user who sends the broadcast message, respectively; and
the response message further carries a uniform resource locator CURL) address of an application store, so that the terminal device determines whether an application corresponding to the service type and the service identifier has already been installed, and when the application corresponding to the service type and the service identifier is not installed in the terminal device, sends a download request to a server according to the URL address.

16. The service system front end device according to claim 15, wherein the one or more processors execute the instructions to further, after receiving a display message sent by an application in the terminal device, return a display response message to the terminal device, the display response message indicates that the service system front end device is located within the preset area.

17. The service system front end device according to claim 15, wherein the one or more processors execute the instructions to further, after receiving a display message sent by an application in the terminal device, return a display response message to the terminal device, the display response message indicates that the service system front end device is located within the preset area.

\* \* \* \* \*

UNITED STATES PATENT AND TRADEMARK OFFICE
CERTIFICATE OF CORRECTION

PATENT NO. : 10,038,737 B2
APPLICATION NO. : 14/528947
DATED : July 31, 2018
INVENTOR(S) : Zijun Li Page 1 of 1

It is certified that error appears in the above-identified patent and that said Letters Patent is hereby corrected as shown below:

In the Claims

In Column 14, Line 55, Claim 15, delete "CURL)" and insert --(URL)--.

In Column 14, Line 62, Claim 15, delete "address." and insert --address; and the download request comprises a service type and a service identifier of a service system corresponding to an application that is not installed, so that the server searches for the application corresponding to the service type and the service identifier.--.

Signed and Sealed this
Thirtieth Day of October, 2018

Andrei Iancu
*Director of the United States Patent and Trademark Office*